United States Patent [19]

Bertazzoli et al.

[11] 4,131,148
[45] Dec. 26, 1978

[54] PNEUMATIC TIRE FOR AGRICULTURAL AND INDUSTRIAL VEHICLES

[75] Inventors: Guido Bertazzoli; Roberto Gironi; Angelo Resentini, all of Milan, Italy

[73] Assignee: Industrie Pirelli S.p.A., Milan, Italy

[21] Appl. No.: 668,917

[22] Filed: Mar. 22, 1976

[30] Foreign Application Priority Data

May 22, 1975 [IT] Italy ............................... 23652 A/75

[51] Int. Cl.$^2$ ............................................. B60C 11/08
[52] U.S. Cl. ................................ 152/209 B; D12/151
[58] Field of Search ............ 152/209 R, 209 A, 209 B, 152/209 D; D12/140, 151

[56] References Cited

U.S. PATENT DOCUMENTS

| D. 157,135 | 2/1950 | Forrest et al. | 152/209 D |
| 2,415,290 | 2/1947 | Kreyer | 152/209 B |
| 3,457,981 | 7/1969 | Verdier | 152/209 B |
| 3,467,159 | 9/1969 | Semonin | 152/209 B |
| 3,587,703 | 6/1971 | Hanus | 152/209 B |

Primary Examiner—Robert B. Reeves
Assistant Examiner—Francis J. Bartuska
Attorney, Agent, or Firm—Stevens, Davis, Miller & Mosher

[57] ABSTRACT

A pneumatic tire for a vehicle such as an agricultural tractor or the like has a tread with lugs along each side thereof spaced circumferentially from each other a distance of from 1.5 to 6 times the circumferential width of the lug. The lugs on each side extend obliquely towards the equatorial plane of the tire with the lugs along one side being spaced relative to the lugs along the other side. The surface of the tire between lugs has corners which extend between adjacent lugs and the profile between the corners along a plane parallel to the lugs is concave or rectilinear.

6 Claims, 6 Drawing Figures

PNEUMATIC TIRE FOR AGRICULTURAL AND INDUSTRIAL VEHICLES

The present invention relates to an improvement in pneumatic tires adapted to be used on agricultural and industrial tractors or on other similar or comparable vehicles intended to operate on crumbly, slippery and muddy soil.

In order to be suitable for the above indicated uses, tractor tires are provided with a tread characterized by the presence of lugs of relevant height, which are arranged in circumferentially spaced relation at a distance ranging between 1.5 and 6 times the width of the lugs themselves, measured in the longitudinal direction. These tires may have a carcass of conventional type, namely constituted by crossed plies, or of a radial type, namely formed by plies whose cords lie on meridian planes or form small angles with said planes. In the latter case, as it is known, the tires are provided with a reinforcing structure (the so-called "breaker") arranged on the carcass and below the tread.

During the use of tractor tires, particularly in the above indicated typical conditions of the soil, the lugs of the tread pattern sink more or less completely in the ground and cooperate to insure traction, independently of the structure of the carcass which has been adopted. It follows that the traction capability of the tire is affected both by the self-cleaning ability of the tread, which influences the possibility of penetration of the lugs in the ground, and by the possibility for the lugs, considered singularly, to maintain as high as possible their level of penetration in the ground, as regards time and entity, during their passage below the area of contact between the tire and the ground.

In general, in a good tread of the above described type, the space between successive lugs in the circumferential direction is limited by a single revolution surface of toroidal type radiused to the lugs.

When such a tread pattern is produced directly during the molding and curing of the tire, as it normally happens, it is noted that the rubber compound constituting the uncured tread band tends to flow during molding towards the mold recesses intended to reproduce the lugs in the tread band. This results in considerable differences of thickness of the rubber compound covering the carcass and/or the reinforcing elements in the zone between two successive lugs of the finished tire. In practice, the thickness of the tread rubber compound in the zone adjacent to the base of the lugs is thin (i.e., is smaller than the required thickness), while in the central area of the zone the compound has a thickness greater than that required and desired. As a result, a tread band having a thickness greater than that which would be strictly necessary is generally employed in order to insure that the rubber thickness present in proximity of the base of the lugs in the finished tire is capable of protecting the inner structure of the tire. This results in having the rubber at the central area of the zone between two successive lugs of an excessive thickness. This obviously represents a waste of rubber and, moreover, lends, during the tire service, to concentrations of the deformations under tension stress, with a consequent exposure of the tread to possible crackings and fatigue ruptures. In addition, there is the fact that, during molding, the flowing of the rubber compound of the tread band towards the recesses of the mold involves distortions of the reinforcing cords present in the inner structure of the tire, with a consequent non-uniform behavior of the finished tire. The adoption of an uncured tread band of greater thickness, in view of the indicated purpose, results in an increase of the disadvantage constituted by the displacement of the reinforcing cords of the tire during molding.

In order to eliminate the above drawbacks, it has been proposed to adopt for tires of this kind a tread in which the convexity of the surfaces between successive lugs is changed to substantially circumferentially flat or concave surfaces. This results in having the tread rubber situated in the central area of the zone between the lugs, of a thickness not greater than that of the tread rubber adjacent to the base of the lugs themselves. However, it has been noted that such a tread, although it overcomes the disadvantages occuring during the tire molding, does not involve any advantage as regards the self-cleaning ability of the tread in use and the consequent capacity of penetration of the tread lugs in the ground.

It is therefore an object of the present invention to provide a tire intended to be used on agricultural and industrial tractors having a tread which, in addition to eliminating the above disadvantages, is highly efficient, in its ability to expell the earth which accumulates between the lugs, and has improved traction capability.

Another object of the invention is to provide a pneumatic tire for tractors and the like having an improved self-cleaning tread structure.

Other objects will become apparent from the following description with reference to the accompanying drawing wherein FIG. 1 is a partial top view of a tread of one embodiment of the tire of the present invention;

Figure 2:
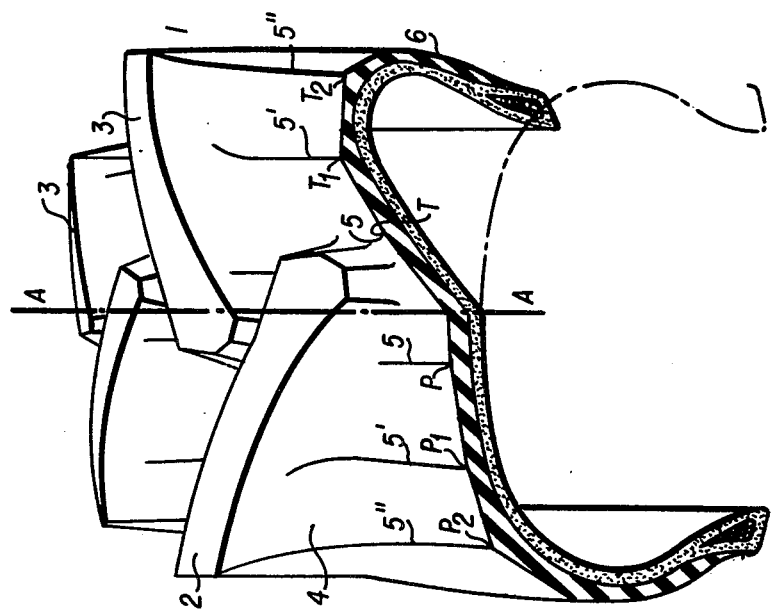
FIG. 2 is a partial perspective view of the tread of the embodiment of the tire of FIG. 1, cut partially with a radial plane and partially with a plane parallel to the lugs of a series.

The foregoing objects are accomplished in accordance with the present invention by providing a pneumatic tire for agricultural and industrial tractors having a tread of the type having a plurality of lugs arranged in succession along the tire circumference in two contiguous series offset with respect to each other on opposite sides with respect to the equatorial plane of the tire, the lugs of each series extending obliquely from the tread edges towards the equatorial plane and being longitudinally spaced apart from one another by a distance ranging between 1.5 and 6 times the longitudinal width of the lugs, characterized in that the tire comprises corners extending at least on the tread surface between two adjacent lugs, the portion of the profile between every two contiguous corners, defined by the tire section taken with a plane parallel to the lugs, being concave or, at the limit, rectilinear.

The tread, in a manner known per se, may have lugs extending obliquely from its edges as far as to occupy only partially its surface, namely without interfering with the trace of the equatorial plane of the tire, or lugs extending as far as to interfere with the latter, or else lugs going beyond it for a certain length.

The above described tire is moreover characterized in that each tire section, taken with a radial plane at the tread surface between the lugs and intersecting at least two contiguous corners, defines on said surface a profile length, between said two corners, which is concave, or, at the limit, rectilinear.

According to an alternative embodiment of the present invention, the tread of the tire for agricultural and industrial tractors is such that each longitudinal section of the tire defines, at the tread surface between the lugs, a continuous line which is concave, or, at the limit, rectilinear.

More particularly, according to the alternative embodiment, the tread has corners which, extending on the tread surface between two adjacent lugs, are situated on circumferential lines of the tire. The corners may extend on the lateral surface of the lugs as far as to join with the corners of the lugs themselves.

According to another alternative embodiment of the present invention, the tread of the tire for agricultural and industrial tractors is such that at least a longitudinal section of the tire defines, at the tread surface between the lugs, a broken line constituted by concave, or, at the limit, rectilinear lengths.

More particularly, according to this alternative embodiment, the tread has corners which extend at least on the tread surface between the two adjacent lugs, the corners connecting the adjacent lugs of each series being inclined with respect to the equatorial plane of the tire, and each corner forming with said plane, in the direction of the forward motion of the vehicle, an angle ranging between 0° and 90°.

Conveniently, the corners are inclined, according to the above indicated values, symmetrically with respect to the equatorial plane.

Preferably, at least some of the corners which extend on the tread surface, constitute substantially the prolongation of the corners of the lugs.

Also in this second alternative embodiment, like in the first, the corners which depart or do not depart from the corners of a lug may extend on the lateral surface of the adjacent lug as far as to join with the corners of the latter.

The tread described according to this second alternative embodiment is preferably such that the tread surface between the lugs and comprising the corners as indicated above is substantially constituted by a plurality of elementary surfaces which follow one another with a step-shaped path, each corner constituting the element defining the step. In general, the path of the elementary surfaces is such that, starting from each edge of the tread as far as to interfere with the equatorial plane of the tire, the depth of the tread surface between the lugs, measured with respect to the radially outer surfaces of the lugs, is progressively decreasing. Moreover, the step-shaped path of the plurality of the elementary surfaces may be symmetrical with respect to the equatorial plane of the tire or non-symmetrical; in other words, the tread surface between the lugs may have elementary surfaces following one another with a step-shaped path which is equal and symmetrical with respect to the equatorial plane of the tire by starting from each edge of the tread as far as to interfere with said plane, or with a step-shaped path which is different on the sides opposite with respect to said plane.

It has been found that the pneumatic tires having a tread as described above, according to either alternative embodiment of the present invention, besides showing a uniform distribution of the rubber compound of the tread band at the zone disposed between the lugs, afford considerable advantages in view of their service. In fact, it has been noted that the presence of the corners as defined above on at least the tread surface between the lugs, originates a better self-cleaning ability of the tread, facilitating considerably the detachment of the earth compacted between one lug and the other during the tire use.

Consequently, the lugs of the tread so formed show in use a constant high capacity of penetrating in the ground, to the full advantage of the gripping characteristics of the tire.

The present invention will be better understood from the following description, given by way of non-limiting example only and made with particular reference to the attached drawing.

Figure 1:
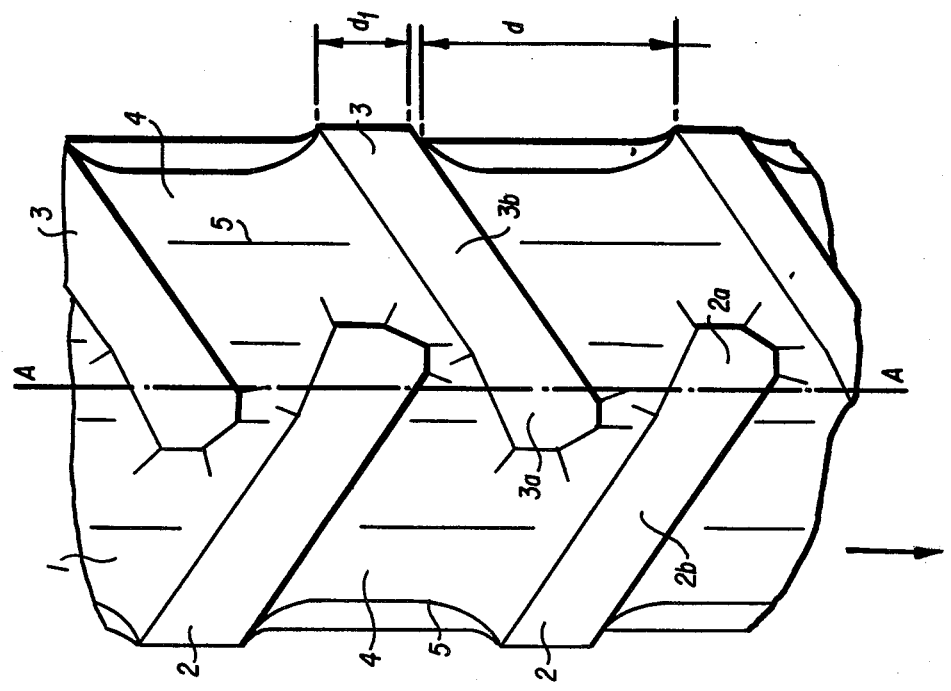

FIG. 1 represents a partial top view of a tread 1 of a tire for agricultural and industrial tractors having a 12.4-28 size according to the first embodiment of the present invention. The tire tread 1 has lugs 2 and 3 arranged in succession along the tire circumference. Lugs 2 are in one series and lugs 3 are in another series of lugs contiguous to the first. As can be noted from FIG. 1, lugs 2 and lugs 3 are disposed in offset position with respect to one another on opposite sides with respect to the trace A—A of the equatorial plane of the tire and extend obliquely to the tread edges so far than they interfere with the trace A—A and pass beyond it for a certain length. The lugs 2, and similarly the lugs 3, are spaced apart from each other by a distance d equal to 170 mm, the longitudinal width $d_1$ of the lugs being equal to 33 mm. Usually, each of the lugs has a head $2a$ or $3a$ of polygonal contour, which in FIG. 1 appears centered on the trace A—A of the equatorial plane of the tire and lateral prolongations $2b$ and $3b$, respectively, whose longitudinal section has the shape of a trapezium. On the surface 4 of the tread disposed between the adjacent lugs 2, as well as on the analogous surface disposed between the adjacent lugs 3, there are corners 5 which extend between the lateral surfaces of adjacent lugs 2 and between adjacent lugs 3 as far as to join with the corners of the lugs. The corners 5 are disposed on circumferential lines of the tire.

The tread of the tire for agricultural and industrial tractors represented in FIG. 1 is shown in FIG. 2 in a partial perspective view with a part of its trend cut along a plane parallel to the lugs of a series and intersecting the equatorial plane of the tire. More particularly, FIG. 2 represents the tread 1 of the tire 6, in which the part cut along a plane parallel to the lugs results from the section carried out in any zone at the tread surface between the lugs 3. As can be noted, the profile length $T-T_1$ between the two contiguous corners 5 and 5' and defined on the tread surface by the section is rectilinear, and also rectilinear is the profile length $T_1-T_2$ between the corner 5' and the adjacent corner 5''. As has been indicated above, in a tread according to the present invention, the profile lengths can be concave, or alternatively concave and rectilinear.

The part of tread 1, cut along a radial plane, which in FIG. 2 corresponds to that concerned by the lugs 2, shows that also the profile length $P-P_1$ between the two contiguous corners 5 and 5' and defined by the section on the tread surface between the lugs 2 is rectilinear, and also rectilinear is the profile length $P_1$-$P_2$ between the two contiguous corners 5' and 5".

The profile lengths, in a tread according to the invention, can be concave or alternatively concave and rectilinear, and are radiused to one another.

Figure 3:
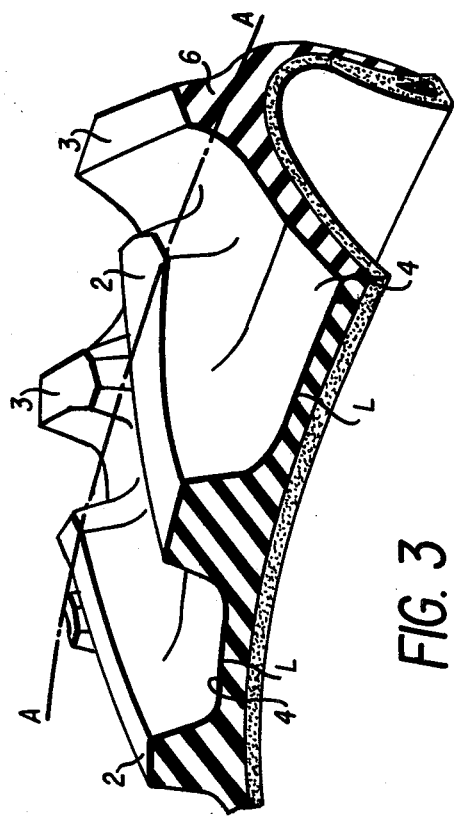
FIG. 3 is a partial perspective view of the tread of the tire of FIG. 1, cut partially with a longitudinal plane and partially with a radial plane.

FIG. 3 represents the tire 6 comprising the tread 1, in a partial perspective view, partially cut along a radial plane and partially cut along a longitudinal plane; the longitudinal section is effected at any zone of the tread surface between the edge of the tread itself and the trace of the equatorial plane. As can be noted, the longitudinal section shows that at any surface 4 of the tread between the adjacent lugs, a rectilinear continuous line L is defined. As indicated above, in a tread according to the present invention the continuous line can be concave.

Figure 4:
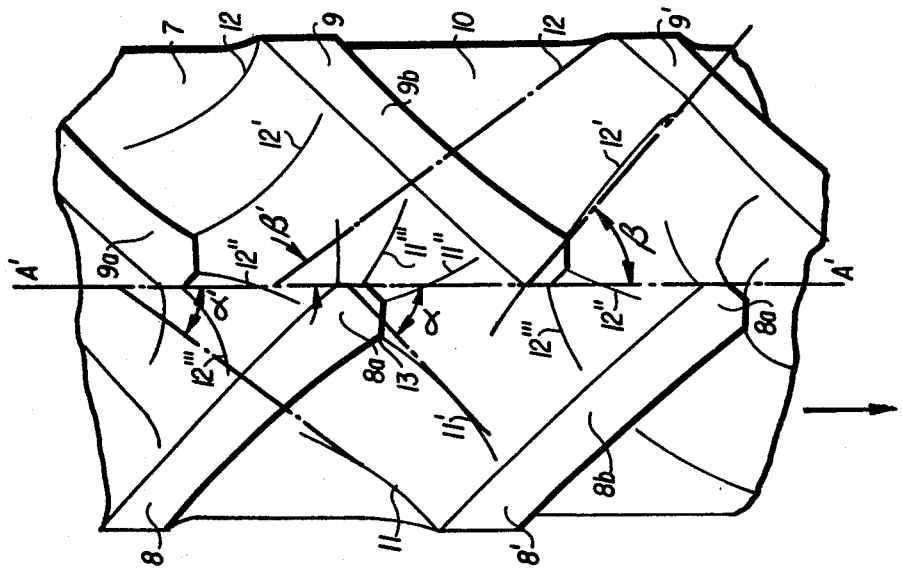
FIG. 4 is a partial top view of a tread of a second embodiment of the tire of the present invention.

FIG. 4 represents, in a partial top view, the tread 7 of a tire for agricultural or industrial vehicles, having a 12.4-36 size, built up according to a second embodiment of the present invention. Such a tread 7 comprises, in a way substantially analogous to that shown in FIG. 1, lugs 8 and 9 belonging to two series, each arranged on opposite sides with respect to the trace A'—A' of the equatorial plane of the tire. Also in the tread, each lug comprises a polygonal head, 8a and 9a respectively, and a lateral prolongation, 8b and 9b respectively, whose longitudinal section has the shape of a trapezium. The side of each head oriented in the longitudinal sense with respect to the tire lies substantially on the trace A'—A' of the equatorial plane. Lugs 8 and 9 are inclined with respect to the equatorial plane and each lug is spaced from the adjacent one, belonging to the same series, by a distance equal to 164 mm, the longitudinal width of the lugs being equal to 44 mm.

On the tread surface 10 between the lugs of each series, there are corners 11, 11' and 11" etc. and 12, 12' and 12" etc., respectively, which constitute substantially the prolongations of the corners from the lugs themselves on the tread surface, and which extend as far as to concern the lateral surface of the adjacent lugs.

In fact, as can be noted, the corner 11' constitutes the prolongation of the corner 13 of the head 8a of a lug 8 on the tread surface between the lug 8 and the lug 8', as far as to terminate on the lateral surface of the latter. The corners 11 and 11' which connect the adjacent lugs 8 and 8' of the same series, and the corners 12 and 12' which connect the adjacent lugs 9 and 9' of the same series are symmetrically inclined with respect to the trace A'—A' of the equatorial plane. More particularly, the edges 11' and 12' form respectively with the trace an angle $\alpha$ and $\beta$ equal to 45°, and the corners 11 and 12 form with the trace an angle $\alpha'$ and $\beta'$ equal to 29°, the arrow indicating the direction of the forward motion of the vehicle on which the tire 6 is fitted.

Figure 5:
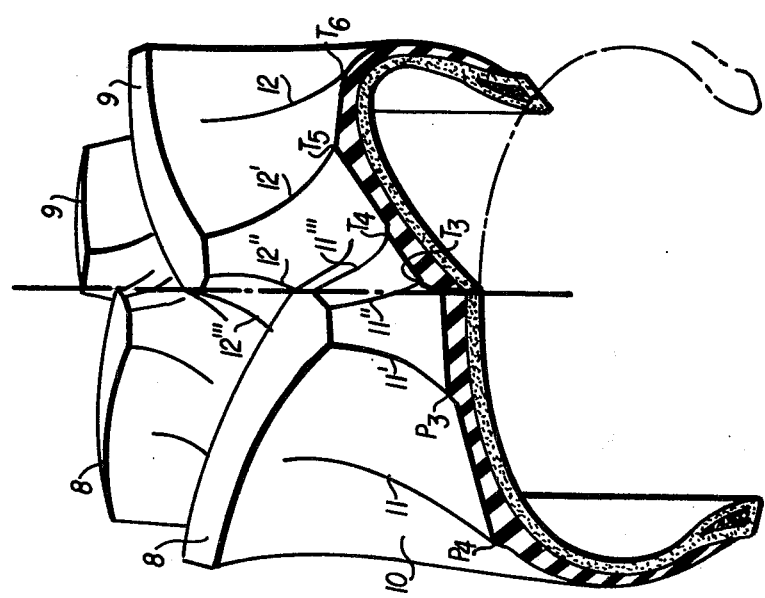
FIG. 5 is a partial perspective view of the tread of the embodiment of FIG. 4, cut partially with a radial plane and partially with a plane parallel to the lugs of a series.

FIG. 5 shows the tire for agricultural and industrial tractors of FIG. 4, in partial perspective view, cut partially along a radial plane and partially (more precisely in the zone at which the tread is concerned with the lugs 9) along a plane parallel to the lugs 9 and intersecting the equatorial plane of the tire. As can be noted, the profile length $T_3$-$T_4$ between the two contiguous corners 11" and 11''', defined on the tread surface by the section, is rectilinear. The profile lengths $T_4$-$T_5$ and $T_5$-$T_6$ comprised respectively between the corner 11''' and the adjacent corner 12', and between the corner 12' and the corner 12 are substantially rectilinear. The rectilinear lengths may be radiused to the corners, as shown for length $T_4$-$T_5$, which is radiused to the corner 11'''.

As said above, in a tread according to the present invention, the profile lengths can be concave, or alternatively concave and rectilinear.

The tread portion 10 cut with a radial plane, which in FIG. 5 corresponds to that concerned by the lugs 8, shows that also length $P_3$-$P_4$ between the corners 11' and 11 and defined by the section on the tread surface between the lugs 8 is rectilinear.

The profile length, in a tread according to the invention, might also be concave; when the radial section of the tread intersects more than two contiguous corners, the profile lengths so defined can even be alternatively rectilinear and concave, and radiused to one another.

Figure 6:
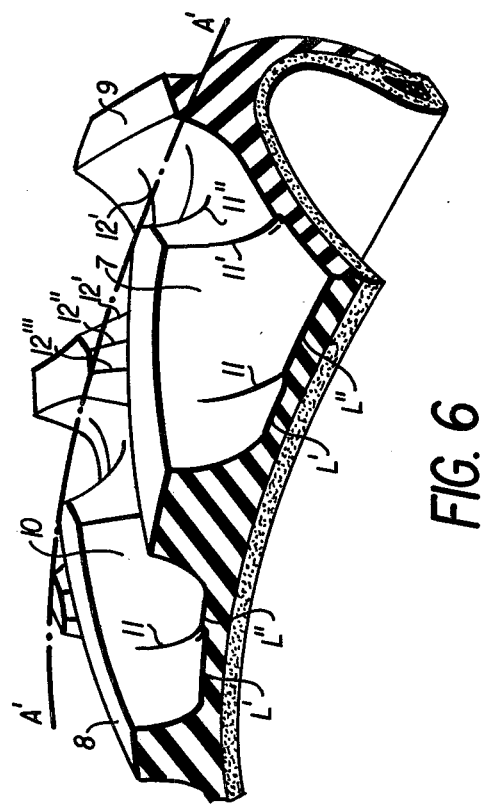
FIG. 6 is a partial perspective view of the tread of the tire of FIG. 4, cut partially with a longitudinal plane and partially with a radial plane.

FIG. 6 represents the tire of FIGS. 4 and 5, in partial perspective view, in which the tread 7 is cut partially along a radial plane and partially along a longitudinal plane passing at a tread zone between the edge of the tread and the trace of the equatorial plane and intersected by the lugs 8. As can be noted, the longitudinal section of the tread shows that at each tread surface 10 between the adjacent lugs a broken line is defined constituted by two rectilinear lengths L' and L", radiused to each other. Obviously, other longitudinal sections obtained in the tread zone define a broken line constituted by a greater number of rectilinear lengths, or a single continuous rectilinear line, and this depending on whether the plane of longitudinal section intersects one or more corners of does not intersect them. Moreover, as indicated above, the lines resulting from the longitudinal sections of the tire may be concave or constituted by concave lengths, in case alternated with rectilinear lengths, radiused to one another.

From FIGS. 5 and 6 it is evident that the tread surface 10, comprising the corners 11, is constituted by a plurality of elementary surfaces which follow one another with a step-shaped path, in which each corner constitutes the element defining the step. In the case shown in the figures, the step-shaped path of the plurality of elementary surfaces constituting the tread surface comprised between every two lugs 8 and every two lugs 9, respectively, is symmetrical with respect to the equatorial plane of the tire.

Although the invention has been described in detail for the purpose of illustration it is to be understood that such detail is solely for that purpose and that those skilled in the art can made variations therein without departing from the spirit and scope of the invention except as it may be limited by the claims.

We claim:

1. In a pneumatic tire for agricultural and industrial tractors, having a tread of the type comprising a plurality of lugs arranged in succession along the tire circumference in two contiguous series offset with respect to each other on the opposite sides with respect to the equatorial plane of the tire with tread surface portions therebetween, the lugs of each series extending obliquely from the tread lateral zone towards said equatorial plane and being longitudinally spaced apart from one another by a distance ranging between 1.5 and 6 times the longitudinal width of the lugs, the sides of said lugs showing a plurality of edges, the depth of the tread surfce between the lugs, measured with respect to the radially outer surface of said lugs, being substantially gradually decreasing from each lateral zone of the tread towards said equatorial plane, the tread comprising a plurality of corners extending at least on the tread portions between two adjacent lugs, the improvement wherein said corners form raised lines on said tread surface portions, said tread surface portions comprising a plurality of elementary flat surfaces and said corners constituting the junction line formed between every pair of contiguous flat surfaces, said continuous flat surfaces being radiused to one another, whereby each tire section taken with a plane either radial or parallel to the lugs of a series and intersecting the equitorial plane of the tire defines on said plane a profile which is constituted by a broken line of rectilinear lengths radiused to one another, each rectilinear length being the portion of said profile between two adjacent corners.

2. A pneumatic tire as in claim 1 wherein at least some of said corners constitute the prolongation of the said edges of the lugs.

3. A pneumatic tire as in claim 1 wherein said corners extended between the adjacent lugs of each series are inclined with respect to the equatorial plane of the tire, each corner forming with said plane, in the direction of the forward motion of the vehicle, an angle ranging between 0° and 90°.

4. A pneumatic tire as in claim 3 wherein said corners extended between the adjacent lugs of each series are inclined symmetrically with respect to the equatorial plane.

5. A pneumatic tire as in claim 1 wherein the tread surface portions between two adjacent lugs, comprise a plurality of elementary flat surfaces which follow one another with a step-shaped path, each corner constituting the element defining the step.

6. A pneumatic tire as in claim 5 wherein the step-shaped path of the plurality of said elementary flat surfaces is symmetrical with respect to the equatorial plane of the tire.